US011865832B2

(12) United States Patent
Neuhofer

(10) Patent No.: US 11,865,832 B2
(45) Date of Patent: Jan. 9, 2024

(54) METHOD FOR DIGITALLY PRINTING A PROFILED STRIP

(71) Applicant: Franz Neuhofer, Zell am Moos (AT)

(72) Inventor: Franz Neuhofer, Zell am Moos (AT)

( * ) Notice: Subject to any disclaimer, the term of this patent is extended or adjusted under 35 U.S.C. 154(b) by 33 days.

(21) Appl. No.: 17/619,216

(22) PCT Filed: Aug. 3, 2020

(86) PCT No.: PCT/AT2020/060286

§ 371 (c)(1),
(2) Date: Dec. 14, 2021

(87) PCT Pub. No.: WO2021/035261

PCT Pub. Date: Mar. 4, 2021

(65) Prior Publication Data

US 2022/0234369 A1 Jul. 28, 2022
US 2022/0355597 A9 Nov. 10, 2022

(30) Foreign Application Priority Data

Aug. 30, 2019 (AT) .............................. A 50760/2019

(51) Int. Cl.
*B41J 11/00* (2006.01)
*B41J 3/407* (2006.01)

(52) U.S. Cl.
CPC ......... *B41J 11/0045* (2013.01); *B41J 3/4073* (2013.01)

(58) Field of Classification Search
None
See application file for complete search history.

(56) References Cited

U.S. PATENT DOCUMENTS

| | | | |
|---|---|---|---|
| 8,104,887 B2 | 1/2012 | Albrecht et al. | |
| 2008/0239048 A1 | 10/2008 | Albrecht et al. | |
| 2019/0067508 A1* | 2/2019 | Spotti | H01L 21/67706 |

FOREIGN PATENT DOCUMENTS

| | | | |
|---|---|---|---|
| DE | 1974928 | A1 | 1/2008 |
| DE | 102011106135 | A1 | 12/2012 |
| DE | 102015203424 | A1 | 9/2016 |
| DE | 102015007325 | A1 | 12/2016 |
| DE | 102017211647 | A1 | 1/2019 |
| EP | 2868478 | A1 | 5/2015 |
| WO | 2012/168020 | A1 | 12/2012 |
| WO | 2016/134960 | A1 | 9/2016 |
| WO | 2016/198159 | A1 | 12/2016 |

* cited by examiner

*Primary Examiner* — Erica S Lin
(74) *Attorney, Agent, or Firm* — Tiajoloff & Kelly LLP; Andrew L. Tiajoloff

(57) ABSTRACT

The invention relates to a device for digitally printing a profiled strip (6), comprising a plurality of digital print heads (3) which can be oriented relative to a conveyor (1) conveying the profiled strip (6) past the print heads (3) in the longitudinal direction. In order to create advantageous guiding conditions, it is proposed that the conveyor (1) has a plurality of conveying members (2) guided in a circulating path, that the circulating path forms a conveying section with a straight guiding section (5) for the conveying members (2), and that the conveying members (2) are provided with a receptacle for the profiled strip (6) which holds the profiled strip (6) in a manner fixed against displacement during the movement of the members along the straight guiding section (5).

15 Claims, 3 Drawing Sheets

METHOD FOR DIGITALLY PRINTING A PROFILED STRIP

FIELD OF THE INVENTION

Figure 1:
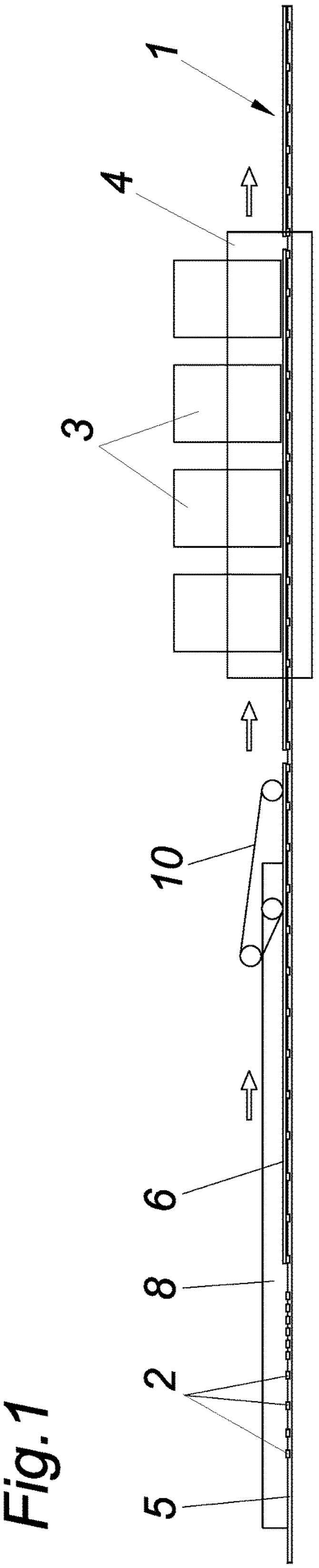

The invention relates to a device for digitally printing on a profiled strip having a plurality of digital print heads, which are can be oriented relative to a conveyor conveying the profiled strip past the print heads in the longitudinal direction.

DESCRIPTION OF THE PRIOR ART

In order to be able to digitally print a profiled strip with a high print quality and largely in accordance with a print template, it is not only necessary to align the individual print heads independently of one another with respect to the profiled strip and to control them with respect to the ejection of the ink droplets from the nozzles of the print heads, which is decisive for the print image, but it is also necessary to ensure an accurate relative movement of the print heads with respect to the profiled strip in its longitudinal direction. To this end, it is known (EP 2 868 478 A1) to clamp the profiled strip to a rigid support by means of clamping means in order to ensure that the profiled strip remains straight during printing, irrespective of whether the support with the profiled strip clamped is moved relative to the print heads held during printing or whether the print heads are moved relative to the fixed support in the longitudinal direction of the profiled strip. The clamping of the profiled strip to be printed on a support ensures a straight course of the profiled strip, but is associated with a considerable construction and handling effort.

In order to avoid this effort, the profiled strips to be printed are guided past the aligned print heads with the aid of a conveyor, wherein side guides are intended to prevent the profiled strip from running on the conveyor and pressure rollers are intended to prevent the profiled strip from lifting off the conveyor. However, it has been found that these measures are not sufficient to ensure an accurate, aligned path of the profiled strip, especially when the profiled strip is made of wood.

SUMMARY OF THE INVENTION

The invention is thus based on the object of designing a device for the guided conveying of a profiled strip in the longitudinal direction opposite aligned print heads in such a way that a straight guidance for the profiled strip can be ensured with a comparatively low construction and handling effort.

This object is solved in that the conveyor has a plurality of conveying members guided in a circulating path, that the circulating path forms a conveying section with a straight guiding section for the conveying members, and that the conveying members are provided with a receptacle for the profiled strip which holds the profiled strip in a manner fixed against displacement during the movement of the members along the straight guiding section.

Due to the large number of conveying members, which are moved along a straight guiding section and accommodate the profiled strip in a fixed position, the profiled strip is held in place with a large number of support points distributed over the length of the strip, so that the profiled strip, which is taken over aligned by the conveying members, can be conveyed past the print heads in this alignment by the conveying members without having to secure this straight guidance by appropriately controlled pressure rollers or lateral guides.

In order to obtain an advantageous guide length which permits a strip support which is largely effective over the strip length, even when printing the end regions, the conveyor designed for a maximum length of the profiled strip can have a straight guiding section with a length corresponding to at least twice the design length for the profiled strip.

The shear-resistant connection between the profiled strip and the receptacles of the conveying members can be solved constructively in different ways. For example, it is possible to provide the receptacles of the conveying members for the profiled strip with spikes projecting towards the profiled strip which, when the receptacles of the conveying members are pressed against the profiled strip after the latter has been transferred to the conveyor, penetrate into the wood material of the profiled strip and hold the profiled strip in a force-fitting manner against lifting and in a form-fitting manner against displacement transversely to the spikes.

Another possibility of holding the profiled strip on the conveying members in such a way that it cannot be displaced is to provide the receptacles of the conveying members for the profiled strip with suction holders, so that the profiled strip is sucked onto the conveying members when it is taken over by the conveyor and is thus held in a shear-resistant manner with respect to the individual conveying members.

Finally, it is also possible to mechanically hold the profiled strip in the receptacles of the conveying members, for example by means of grippers or clamping jaws, which take over the profiled strip in the aligned transfer position.

The alignment of the profiled strip can preferably be carried out with the aid of an alignment device associated with the conveyor. Simple design conditions result in this context if the alignment device has an alignment stop for one longitudinal side of the profiled strip and an actuator, with the aid of which the profiled strip is pressed against the alignment stop while compensating for deviations from the required straight course and is held in this alignment position until it is transferred by the conveyor in a shear-resistant manner.

Particularly advantageous design conditions result in this context if the alignment stop extends along a takeover area of the straight guiding section of the conveyor and if, on the outlet side of the takeover area, a device is provided opposite the conveying members in relation to the profiled strip for pressing the profiled strip against the receptacles of the conveying members. In this case, it is ensured by comparatively simple constructive means that the profiled strip can be held in an aligned, straight course without play in the receptacles of the conveying members for subsequent printing.

If the takeover area of the straight guiding section is connected to a cross conveyor for the profiled strips to be printed on the side opposite the alignment stop, the profiled strips conveyed by means of the cross conveyor can be pressed against the alignment stop one after the other and taken over by the conveyor one after the other in the longitudinal direction.

Running belts or slide rails can be used as the alignment stop. In an analogous manner, the actuator associated with the alignment stop can have a running belt or a slide rail, if individual pressure bodies are not applied to the profiled strip.

BRIEF DESCRIPTION OF THE INVENTION

Figure 2:
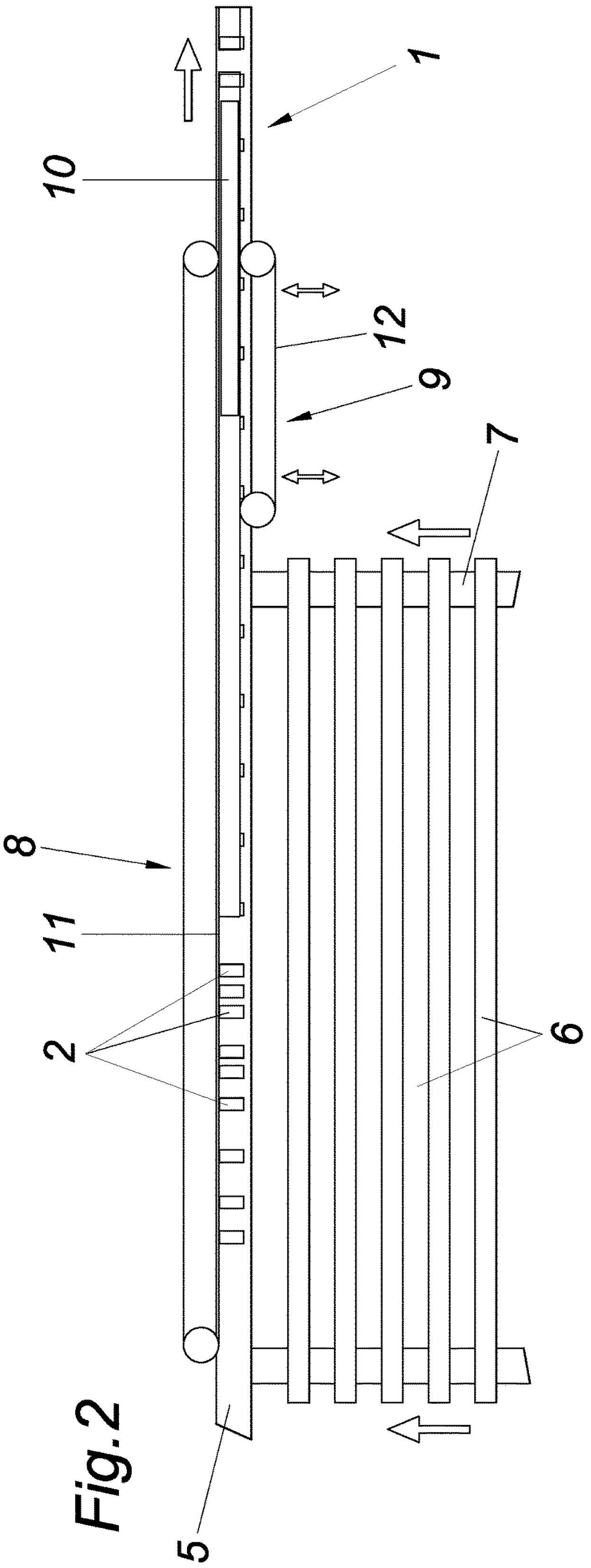
Figures 3, 4:
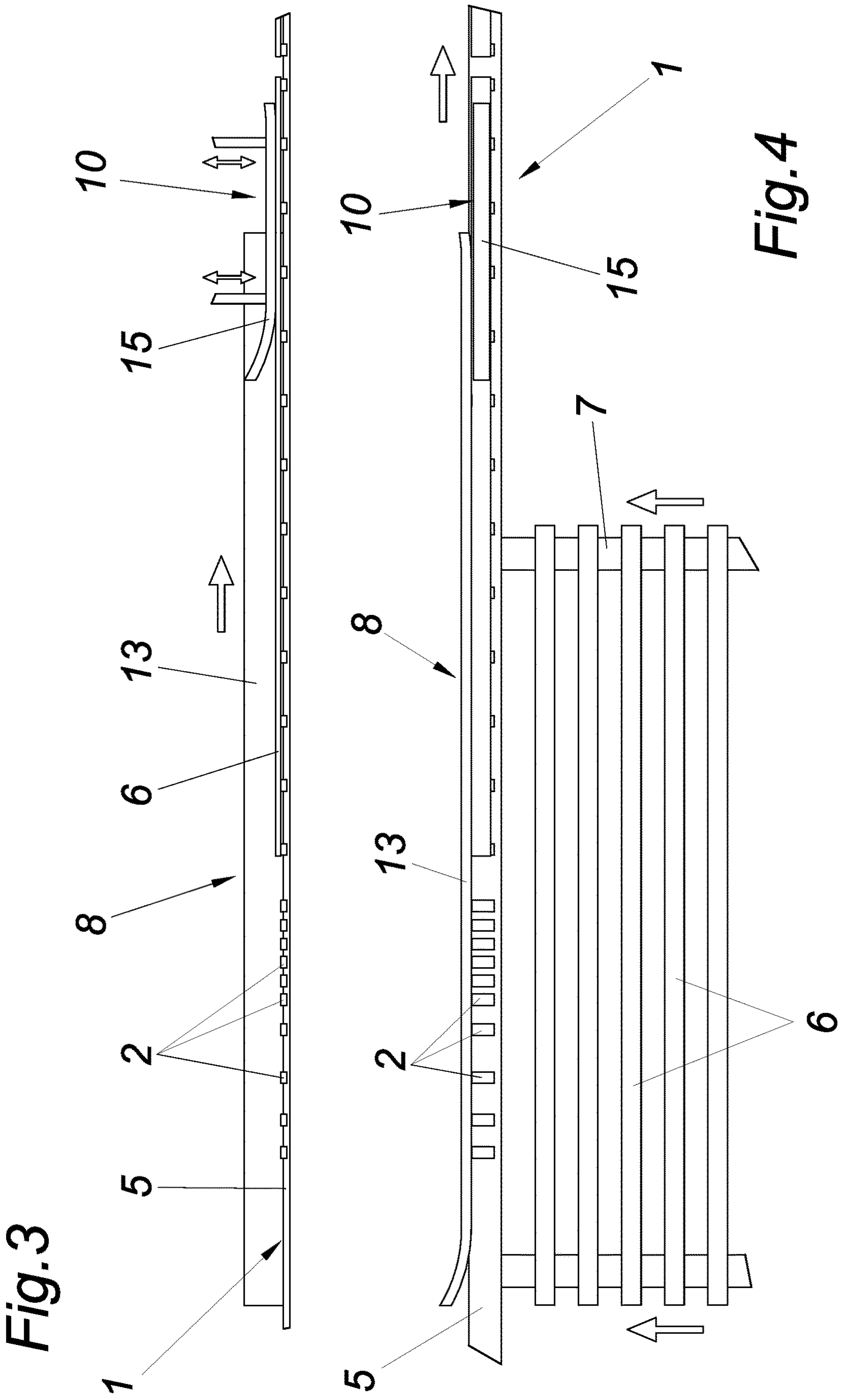
Figures 5, 6:
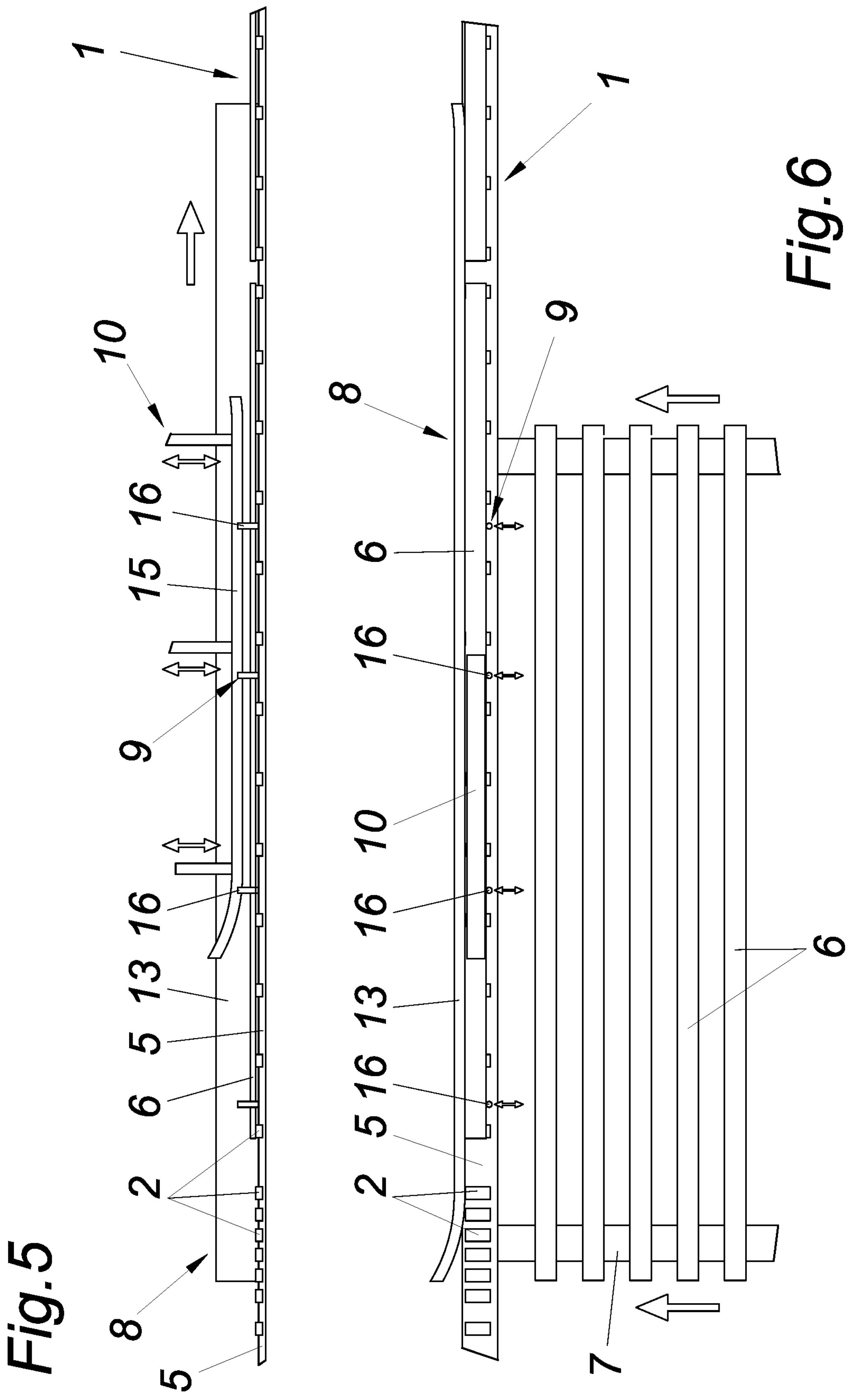

In the drawing, the subject matter of the invention is shown by way of example, wherein:

FIG. 1 shows a schematic side view of a device according to the invention for digitally printing a profiled strip, FIG. 2 shows this device in the takeover area in a top view on a larger scale, FIG. 3 shows a schematic side view of an embodiment variant of a device according to the invention in the takeover area on a larger scale, FIG. 4 shows a top view of the device according to FIG. 3, and FIGS. 5 and 6 show a further embodiment of a device according to the invention in a representation corresponding to FIGS. 3 and 4.

DETAILED DESCRIPTION OF THE PREFERRED EMBODIMENTS

According to FIGS. 1 and 2, the device for digitally printing a profiled strip has a conveyor 1 which has conveying members 2 guided in a circulating path, which accommodate the profiled strips to be printed in receptacles in a manner fixed against displacement. These receptacles may be provided with spikes projecting towards the profiled strips for holding them in a thrust-resistant manner. However, it is also possible to equip the receptacles with suction holders or mechanical grippers in order to be able to connect the profiled strips to the conveying members 2 in such a way that they cannot slide. The aligned profiled strips are moved in the longitudinal direction along a conveying path past print heads 3 of a digital printing device 4 and are printed in the process. For this purpose, the print heads 3 must be appropriately aligned with respect to the conveyor 1. For the straight guidance of the profiled strips, the conveying section of the conveyor 1 forms a straight guiding section 5 for the conveying members 2, so that the aligned profiled strips taken over from the conveying members 2 can be moved past the print heads 3 in the position taken over and held in their alignment by the shear-resistant holding device in the receptacles of the conveying members 2.

For the alignment of the profiled strips 6 to be printed, a cross conveyor 7 is provided according to FIG. 2, which adjoins the straight guiding section 5 of the conveyor 1 in a takeover area. On the side of the straight guiding section 5 opposite the cross conveyor 7, an alignment stop 8 is provided for one longitudinal side of the profiled strips 6. The profiled strips 6, which are pushed onto the conveying members 2 by means of the cross conveyor 7 in the transfer region, are pressed against the alignment stop 8 with the aid of an adjusting drive 9 and are thus aligned in the longitudinal direction with respect to the alignment stop 8. In this aligned position, each profiled strip 6 is acted upon by means of a device 10 for pressing the profiled strip 6 against the receptacles of the conveying members 2, so that, for example, when spikes are provided in the receptacles, the profiled strips 6 are pressed onto these spikes with the effect that the profiled strips 6 are held positively relative to the conveying members 2 by the spikes penetrating the wooden valuable material of the profiled strips 6. The profiled strips 6, aligned in this manner over their underside, can then be printed on the clamp-free sides before the profiled strips 6 are released again from the conveying members 2 following the printing device 4.

In the exemplary embodiment according to FIGS. 1 and 2, both the alignment stop 8 and the actuator 9 are formed by a running belt 11 and 12, respectively, which entails a support of the conveying of the profiled strips 6 in the takeover area of the conveying section of the conveyor 1. Similarly, the device 10 for pressing the profiled strips 6 against the conveying members 2 may also comprise a running belt.

In contrast to the design of the device according to FIGS. 1 and 2, in the design according to FIGS. 3 and 4 the alignment stop 8 is formed by a slide rail 13. The actuator 9 for pressing the profiled strips 6 against the alignment stop 8 is omitted in these illustrations for reasons of clarity, but may likewise comprise a slide rail. The device 10 for pressing the profiled strip 6 against the conveying members 2 comprises a pressure shoe 15, with the aid of which the play-free contact of the profiled strips 6 against the receptacles of the conveying members 2 is ensured.

A further possibility for providing an embodiment of a device according to the invention for digitally printing a profiled strip 6 is shown in FIGS. 5 and 6. In this exemplary embodiment, the alignment stop 8 is formed by a slide rail 13, while the actuator 9 is constructed from individual pressure bodies 16 which press the profiled strip 6 against the slide rail 13. The device 10 is formed by a pressure shoe 15, which is arranged in the immediate takeover area of the conveyor 1 and is preferably operated in a clocked manner in order to be able to apply greater pressing forces.

The invention claimed is:

1. A device for digitally printing a profiled strip, said device comprising:
- a plurality of digital print heads oriented relative to a conveyor conveying the profiled strip past the print heads in a longitudinal direction;
- wherein the conveyor has a plurality of conveying members guided in a circulating path; and
- wherein the circulating path forms a conveying section with a straight guiding section guiding the conveying members; and
- wherein the conveying members are provided with a receptacle receiving and holding the profiled strip fixed against displacement during movement of the conveying members along the straight guiding section; and
- wherein the conveyor is associated with an alignment device having an alignment stop structure engaging a longitudinal side of the profiled strip and having an actuator pressing the profiled strip against the alignment stop structure, and the profiled strip is supported on at least two of the conveying members.

2. The device according to claim 1, wherein the conveyor is configured to convey the profiled strip with a maximum length has a straight guiding section with a length corresponding to at least twice the maximum length of the profiled strip.

3. The device according to claim 1, wherein the receptacles of the conveying members have spikes projecting against the profiled strip.

4. The device according to claim 1, wherein the receptacles of the conveying members have suction holders.

5. The device according to claim 1, wherein the receptacles of the conveying members have grippers.

6. The device according to claim 1, wherein the alignment stop structure extends along a takeover area of the straight guiding section, and wherein, on an outlet side of the takeover area, a device opposite the conveying members with respect to the profiled strip presses the profiled strip against the receptacles of the conveying members.

7. The device according to claim 6, wherein the takeover area of the straight guiding section is connected on a side opposite the alignment stop structure to a cross conveyor conveying the profiled strips to be printed.

8. The device according to claim 6, wherein the alignment stop structure or the actuator associated therewith comprises a running belt.

9. The device according to claim 6, wherein the alignment stop structure or the actuator associated therewith has a slide rail.

10. The device according to claim 7, wherein the alignment stop structure or the actuator associated therewith comprises a running belt.

11. The device according to claim 7, wherein the alignment stop structure or the actuator associated therewith has a slide rail.

12. The device according to claim 2, wherein the alignment stop structure extends along a takeover area of the straight guiding section, and wherein, on an outlet side of the takeover area, a device opposite the conveying members with respect to the profiled strip presses the profiled strip against the receptacles of the conveying members.

13. The device according to claim 12, wherein the takeover area of the straight guiding section is connected on a side opposite the alignment stop structure to a cross conveyor conveying the profiled strips to be printed.

14. The device according to claim 13, wherein the alignment stop structure or the actuator associated therewith comprises a running belt.

15. The device according to claim 13, wherein the alignment stop structure or the actuator associated therewith has a slide rail.

* * * * *